US009088673B2

(12) United States Patent
Banner et al.

(10) Patent No.: US 9,088,673 B2
(45) Date of Patent: Jul. 21, 2015

(54) IMAGE REGISTRATION

(75) Inventors: Ron Banner, Yokneam (IL); Omer Barkol, Haifa (IL); Daniel Freedman, Zichron yaakov (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 123 days.

(21) Appl. No.: 13/825,793

(22) PCT Filed: Sep. 24, 2010

(86) PCT No.: PCT/US2010/050242
§ 371 (c)(1),
(2), (4) Date: Jun. 7, 2013

(87) PCT Pub. No.: WO2012/039719
PCT Pub. Date: Mar. 29, 2012

(65) Prior Publication Data
US 2014/0146370 A1 May 29, 2014

(51) Int. Cl.
*G03F 3/08* (2006.01)
*H04N 1/00* (2006.01)
*G06T 7/00* (2006.01)
*H04N 1/23* (2006.01)
*G06K 9/62* (2006.01)

(52) U.S. Cl.
CPC .......... *H04N 1/00047* (2013.01); *G06K 9/6232* (2013.01); *G06T 7/001* (2013.01); *G06T 7/0028* (2013.01); *H04N 1/0005* (2013.01); *H04N 1/00005* (2013.01); *H04N 1/00015* (2013.01); *H04N 1/00039* (2013.01); *H04N 1/00063* (2013.01); *H04N 1/00082* (2013.01); *H04N 1/2307* (2013.01); *G06T 2207/20072* (2013.01); *G06T 2207/30144* (2013.01)

(58) Field of Classification Search
None
See application file for complete search history.

(56) References Cited

U.S. PATENT DOCUMENTS

| | | | | |
|---|---|---|---|---|
| 2002/0164074 | A1* | 11/2002 | Matsugu et al. | 382/173 |
| 2004/0098200 | A1* | 5/2004 | Wentland et al. | 702/2 |
| 2005/0281459 | A1* | 12/2005 | Bala et al. | 382/162 |
| 2006/0291696 | A1* | 12/2006 | Shao et al. | 382/103 |
| 2007/0003165 | A1 | 1/2007 | Sibiryakov et al. | |
| 2007/0127101 | A1 | 6/2007 | Oldroyd | |
| 2009/0196475 | A1* | 8/2009 | Demirli et al. | 382/128 |
| 2010/0061601 | A1 | 3/2010 | Abramoff et al. | |
| 2010/0086220 | A1 | 4/2010 | Minear | |
| 2010/0100540 | A1* | 4/2010 | Davis et al. | 707/728 |
| 2010/0100835 | A1* | 4/2010 | Klaric et al. | 715/765 |
| 2011/0069885 | A1* | 3/2011 | Malik et al. | 382/176 |

OTHER PUBLICATIONS

The International Search Report and the Written Opinion of the International Searching Authority, Dated Jun. 3, 2011; International Application No. PCT /US201 0/050242; International Filing Date; Sep. 24, 2010.

* cited by examiner

*Primary Examiner* — Madelein Nguyen
(74) *Attorney, Agent, or Firm* — HP Legal Department

(57) ABSTRACT

An image registration method to register a target image with a reference image is provided, including to determine a target set of features present in the target image, to determine a reference set of features present in the reference image, to generate respective signatures for each feature in the target and reference sets, to match features from the target set to corresponding features in the reference set using the signatures, to generate respective transformations to map pairs of features in the target set to corresponding pairs of features in the reference set, and determine a similarity transformation for the target image using a measure of the accuracy of the transformations.

13 Claims, 8 Drawing Sheets

IMAGE REGISTRATION

CLAIM FOR PRIORITY

The present application is a national stage filing under 35 U.S.C 371 of PCT application number PCT/US2010/050242, having an international filing date of Sep. 24, 2010, which is incorporated by reference in its entirety.

BACKGROUND

Image registration is the process of overlaying two or more images of, typically, the same scene or content. Such images can be taken at different times, from different viewpoints, and/or by different sensors. Alternatively, registration can be used as a tool for comparison of the same image after it has passed through a physical process for example. Image registration is a significant step in image analysis tasks in which information is determined from the combination of various data sources such as in image fusion, change detection, and multichannel image restoration. Typically, registration is used in remote sensing (multispectral classification, environmental monitoring, change detection, image mosaicing, weather forecasting, creating super-resolution images, integrating information into geographic information systems (GIS)), in medicine (combining computer tomography (CT) and NMR data to obtain more complete information about a patient for example, treatment verification and so on), in cartography (map updating), and in computer vision (target localization, automatic quality control), to name a few. Typically, image registration proceeds by geometrically aligning two images—a reference image and a target image. Accordingly, any differences between the images which have been introduced due to different imaging or processing conditions for example can be detected. Typically, registration techniques operate locally on images to be registered, thereby reducing the overall or global accuracy of any resulting registration. Such techniques are also often slow.

BRIEF DESCRIPTION OF THE DRAWINGS

Various features and advantages of the present disclosure will be apparent from the detailed description which follows, taken in conjunction with the accompanying drawings, which together illustrate, by way of example only, features of the present disclosure, and wherein.

DETAILED DESCRIPTION

Figure 1:
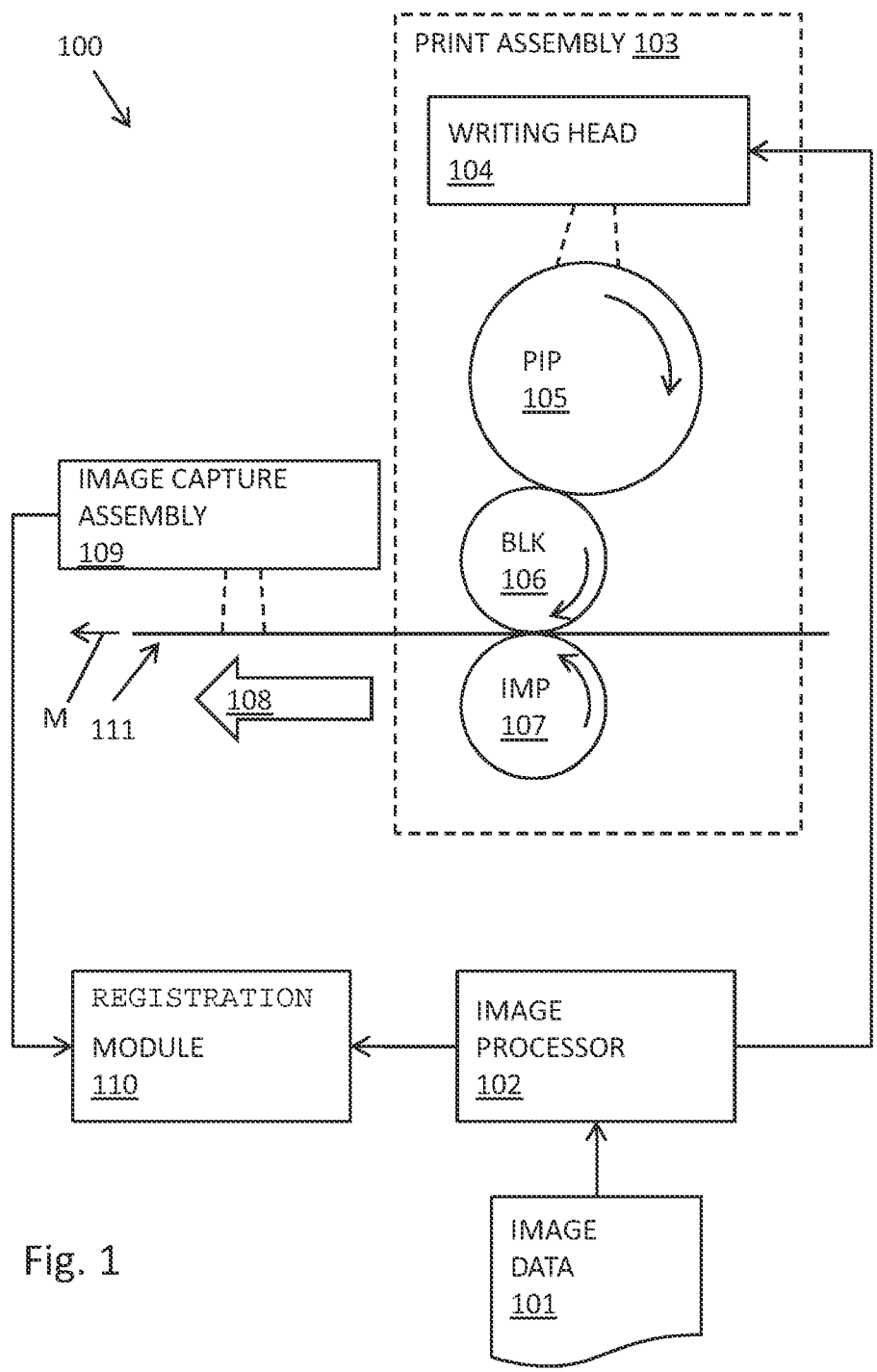
FIG. 1 is a schematic representation of a print system according to an example including provision for detecting defects in a printed image.

An example of a specific use for image registration is in the detection of defects in printed images, which defects can be caused by a number of factors including anomalies in print media, interactions between print media and marking material, systematic errors introduced by print mechanisms or human error. Image defects can include but not be limited to scratches, spots, missing dot clusters, streaks, and banding for example.

Print defects are undesirable and efforts have been made to develop suitable methods for their detection. Such techniques can broadly be categorized as manual (human) inspection or automated inspection. Human techniques are generally more time consuming than automated methods and studies have shown that even where the inspection process is structured and repeatable, manual inspection is not completely accurate. Moreover, the time consuming nature of manual inspection is prohibitive in commercial printing applications where typically a printing press can operate at speeds in excess of two meters per second, necessitating fast inspection of printed images. Such inspection rates are beyond human capability.

In a print system where the quality assurance of a printed image is paramount, such as in commercial print systems for example, it is typical to monitor the printed output of the system in order to determine how it compares against the input. For example, the reproduction of an image can be monitored in order to ensure that colour accuracy is maintained, and also to ensure that defects which may be introduced in the print process are not present, or are otherwise minimized. Accordingly, in a print system, the output can be compared to the input in order to determine the presence of any defects which may have arisen in the course of printing. Accurate comparison requires the output, or target image, to be aligned or registered with the input, or reference image so that the comparison can be performed. Image registration typically includes matching, overlaying or aligning multiple images, for example so that they are geometrically aligned, and so that a meaningful comparison between them can be made free from issues related to differences in the geometry of the images. According to an example, there is provided a method for registering a target image with a reference image. The registered images can be compared for the purposes of defect detection. Registration of the target and reference images uses a global transformation which takes into account image features in the images, and which uses signatures based on the image features for feature matching between images.

Reference will now be made in detail to certain implementations, examples of which are illustrated in the accompanying drawings. In the following description, numerous specific details are set forth in order to provide a thorough understanding of the implementations. Well-known methods, procedures, components, circuits, and networks have not been described in detail so as not to unnecessarily obscure aspects of the implementations.

It will also be understood that, although the terms first, second, etc. can be used herein to describe various elements, these elements should not be limited by these terms. These terms are used to distinguish one element from another. For example, a first item could be termed a second item, and, similarly, a second item could be termed a first item and so on.

The terminology used in the description herein is for the purpose of describing particular implementations and is not intended to be limiting. As used in the description and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "include" and/or "including," when used in this specification, specify the presence of stated features, integers, steps, operations, elements, and/or components, but do not preclude the presence or addition of one or more other features, integers, steps, operations, elements, components, and/or groups thereof.

FIG. 1 shows a print system 100 for printing an image from image data 101 to give a printed image 111. The system 100 includes a print assembly 103 which in turn includes a writing head 104, a photo imaging plate (PIP) 105, a blanket drum (BLK) 106 and an impression drum (IMP) 107. The illustrated print assembly 103 corresponds generally to that of an offset lithographic printer, however it will be appreciated that print assembly 103 is provided for illustrative purposes, and that any suitable mechanism for printing an image from image data can be used (e.g. laser printers, inkjet printers, dye-sublimation printers etc.). Also included in the system 100 is an image capture assembly 109, a registration module 110 and an image processor 102. The image capture assembly 109 can be any device capable of converting an image on a print medium or product to digital image data. Image capture assembly 109 can be an in-line image capture assembly 109 and/or an in-line scanning system. It can be arranged within the printer so as to capture an image of medium 111 moving in direction 108 with respect to the in-line image capture assembly 109. The image capture assembly 109 can be arranged to capture an image of the printed medium at a lower resolution than the print resolution. The image capture assembly 109 can be arranged to capture a part of the printed image and/or the entire printed image. The image capture assembly 109 can include one or multiple image capture sensors such as photosensors, LEDs, laser diodes, scanners, etc. For example, multiple scanners can be arranged next to each other, each scanner having a width that can be less than the maximum medium width, wherein the scanning areas of the scanners can overlap. The image capture assembly 109 can be arranged to capture images on one or two sides of the medium 111, e.g. for two sided printing. For example, scanners can be arranged on opposite sides so that a medium 111 passes between the two opposite scanners and is scanned on both printed sides. Each sensor can be arranged to capture a part of the image printed onto the medium 111, and/or the entire width of the medium 111. The sensor can include a one color channel, i.e. monochrome, or a multiple color channel sensor, for example, to capture a gray level and/or RGB (colour) target image, respectively.

Image data 101 representing an image to be printed is received by the image processor 102 which converts the image to a raster image suitable for the print mechanism 103 using established techniques. The raster image is sent to the print mechanism 103 and the writing head 104 produces the image on the PIP 105. In turn, the PIP transfers the image to the BLK 106 which then transfers the image onto a print medium or product such as sheet paper 111 on the IMP 107. Once the printed image exits the print mechanism 103 in direction 108, image capture assembly 109 captures the printed image on media 111 (either incrementally or as a whole) and sends the corresponding image data as a target image to the registration module 110. The image processor 102 also generates a reference image associated with the image data 101 and sends the reference image to the registration module 110. The registration module 110 receives the target image and reference image and generates a transformation for geometrically transforming the target image for registration with the reference image. The transformation for the target image obviates the effects of any distortions which can be present as a result of artifacts from the scanning process. For example, any of rotations, translations and scaling of the target image can have occurred, which should typically be corrected in order for the target image to be registered with the reference image, such as for the purposes of defect detection for example.

According to an example, the registration module 110 is described as a single module which can perform the task of image registration. However, registration module 110 can be functionally replaced with a module for registering images and comparing the registered images. Alternatively, comparison of registered images can be performed by image processor 102.

Figure 2:
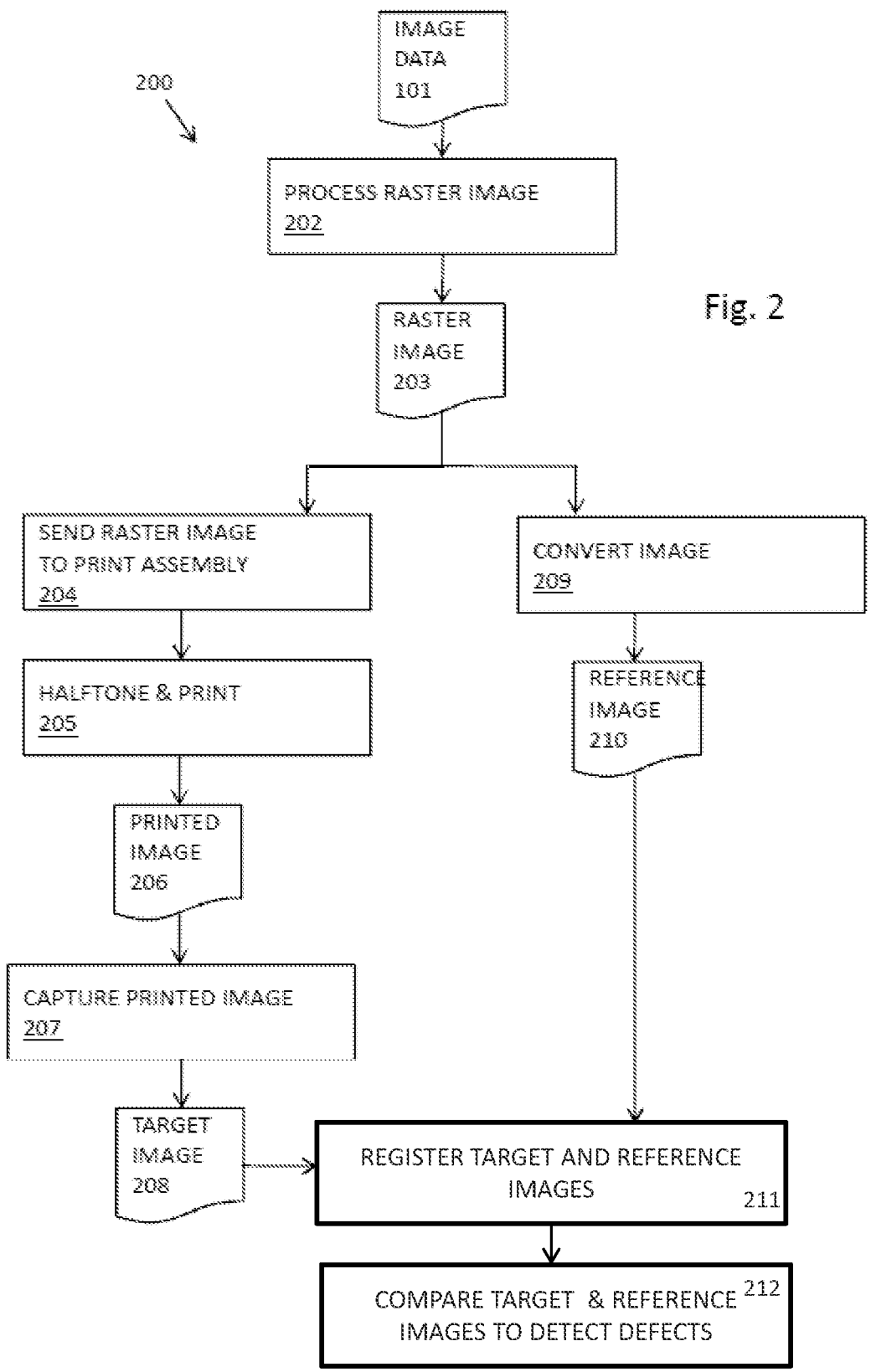
FIG. 2 is a flow chart representing an automated inspection method for detecting a defect in a printed image according to an example.

FIG. 2 is a flow chart representing an automated inspection method 200 for detecting a defect in a printed image 206. Image data 101 can be received as input by the print system 100. The image data 101 can include a scanned analogue image, and/or digital image data received via a computer, network and/or digital data carrier such as a portable document format (pdf) file for example.

The image data 101 can be processed by the image processor 102. The image processor 102 can generate a raster image 203, or the image data 101 can include a pre-generated raster image 203. The image processor 102 can send the raster image 203 to the print assembly 103 in block 204 for subsequent halftoning and electrophotographic printing. The raster image 203 can be in a resolution and format that is appropriate for the print assembly 103 concerned, such as in a print resolution. For example, for a LEP system the raster image 203 can be generated at a resolution of approximately 812 DPI (Dots Per Inch), for example in a CMYK (cyan, magenta, yellow, black) color space, for a corresponding print resolution of 812 DPI. Here, the print resolution can be indicated by pixels resolution in dots per inch (DPI). The image processor 102 can include information describing the desired intensity and/or density level of each pixel in each of the color planes in the raster image 203.

During the print process, the raster image 203 can be halftoned into different color patterns in block 205, within the print assembly 103. A printed image 206 can be printed onto a medium 111. The print process can include an electrographic print process as described above. The medium 111 can for example include paper, or any other suitable substrate. The printed resolution can be understood as the printed dots (pixels) resolution, which can correspond to the raster image resolution. For example, the printed resolution can be 600 DPI or more, for example 812 DPI, for example corresponding to the resolution of the raster image. The printed image 206 can be captured in block 207 by the image capture assembly 109. The image capture assembly 109 captures the printed image 206 as a target image 208, wherein the target image 208 can have a lower resolution than the printed image 206. The resolution of the target image 208 can be dependent on the components of the image capture assembly 109. Alternatively, the image capture assembly 109 can capture a target image with the same resolution as the printed resolution and/or the print resolution.

The image processor 102 generates a reference image 210 in block 209. The image processor 102 can convert the raster image 203 into the reference image 210, or alternatively, the reference image 210 can be generated directly from the input image data 101 (not shown). The reference image 210 can be in a format that is suitable for the registration operation of block 211 in which the target and reference images are registered. In block 212 the registered target and reference images are compared to detect defects in the printed image. The target image 208 can be constrained by the image capture assembly 109 used and/or the processing power available to the processing unit 110. In the conversion of block 209, the resolution of the reference image 210 can be chosen to match, or to be close to, the target image 208 resolution produced by the image capture assembly 109. The resolution of the reference image 210 can be dependent of and/or close to the output image resolution of the image capture assembly 109. The target image 208 can be processed to match the resolution of the reference image 210. In another example, both the reference image 210 and the target image 208 can be processed to conform to a mutual resolution.

Figure 3:
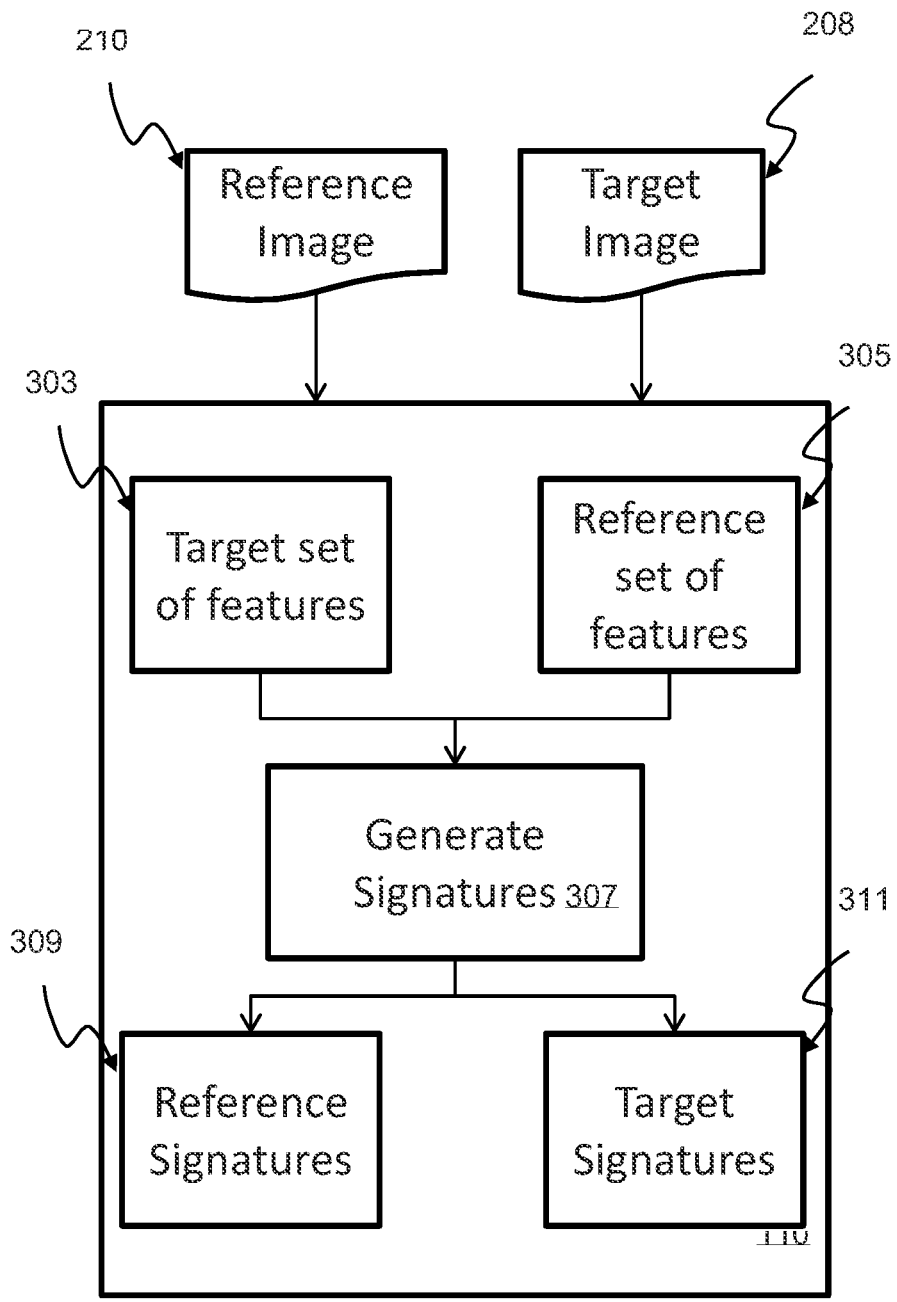
FIG. 3 is a flow chart representing a process for matching features in a target and reference images according to an example.

FIG. 3 is a flow chart representing a process for matching features in target and reference images. Registration module 110 receives input data representing a reference image 210 and a target image 208. Registration module 110 processes the images in order to derive respective sets of features for the images. According to an example, a mean-shift clustering method can be used to derive image features. Such a process typically involves clustering points in an image with similar colours and positions together. So, for example, in an image of a person with a blue shirt, the blue pixels might be clustered into a single cluster (in practice, there might be more than one such cluster of blue pixels). The features are then the centres of each cluster, where the centre is described by both its colour and position.

Accordingly, a target set of features 303 for the target image and a reference set of features 305 for the reference image are determined. In block 307 signatures are generated for the features, thereby forming a set of reference signatures 309 for the features of the reference image, and a set of target signatures 311 for the features of the target image. According to an example, a signature for a feature is a histogram of normalized distances from the feature to all other determined features in the same set, that is, in the same image. Since such signatures do not depend on any information other than the relative distances between image features, they are invariant to rotation, translation or scaling and can therefore be compared in order to match signatures in the scanned and reference image. The sets of signatures for the target and reference images are formed into a bipartite graph according to an example, with the weight of an edge between points in the graph representing the similarity of features in the target and reference images. Signatures are compared to determine a maximum weighted bipartite matching by subtracting signatures (histograms) element by element. Each signature for the target (or reference) image is compared to each signature in the reference (or target) image in order to determine the maximum weighted matching which gives a mapping between corresponding (or equivalent) features in the images.

Figure 4:
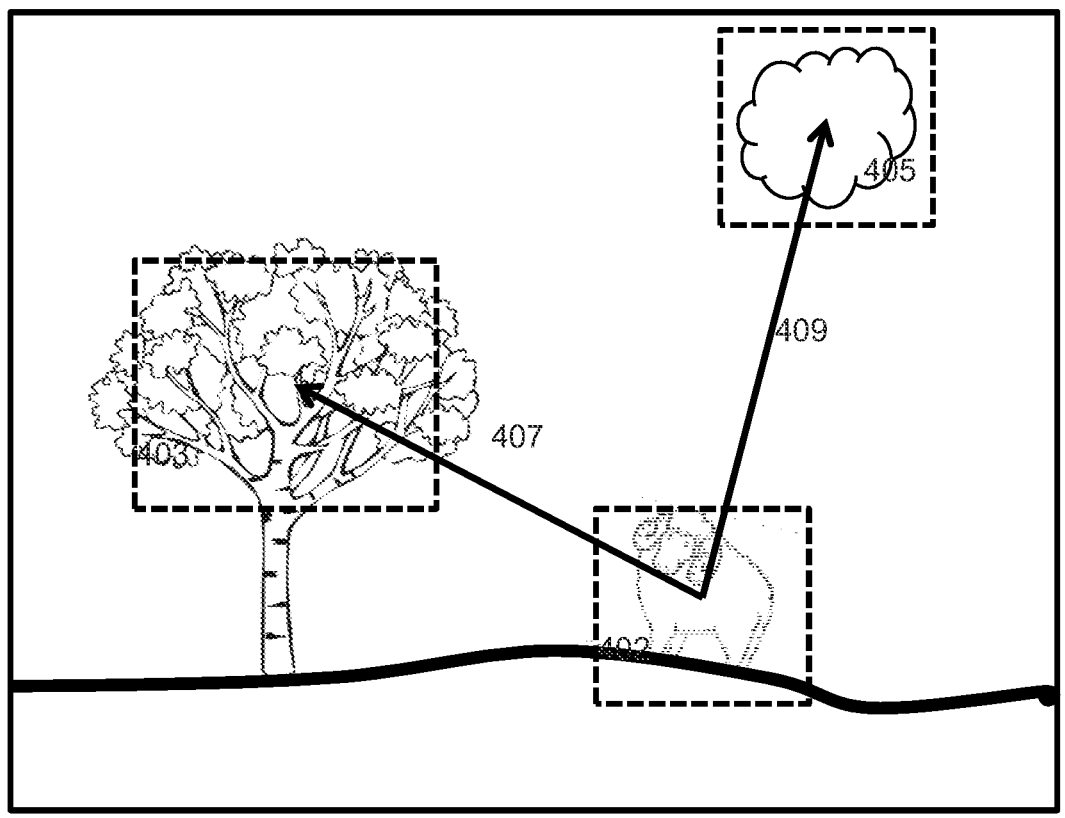
FIG. 4 is a schematic representation of an image (which can be a target or reference image) which depicts some image features and gives a diagrammatic representation of a signature for a feature according to an example.

FIG. 4 is a schematic representation of an image (which can be a target or reference image) which depicts some image features and gives a diagrammatic representation of some components of a signature for a feature. Image 400 includes some image features such as 402, 403 and 405. It will be appreciated that more or less features can be present in an image. The image features can be salient portions of the image, or otherwise portions of the image determined using the mean-shift clustering method described above. A cluster for an image feature, generally depicted by a dashed box, is centred at a feature 402, 403, 405. For a given feature, such as 402 for example, a signature for the feature includes a normalized histogram representing the distance from the feature 402 to all other identified features in the image. Accordingly, with reference to FIG. 4, lines 407, 409 represent the distance between feature 402 and features 403, 405 respectively. The signature is normalized with respect to the distance to feature 405 since this is the farthest away from 402. Corresponding signatures are generated for all other features of an image in the same way in order to provide a set of signatures for the target image and a set of signatures for the reference image. An image feature can be represented by a single point. For example, in the case of FIG. 4, lines 407, 409 originate from a point within the dashed box 402, and that point can be taken to be representative of the position of the feature within the box 402. According to an example, the point can be the centre of a cluster derived from a feature (where the centre is described by both the colour and position of the cluster as explained above), or otherwise the centre of a bounding box arranged around a determined feature for example.

Figure 5:
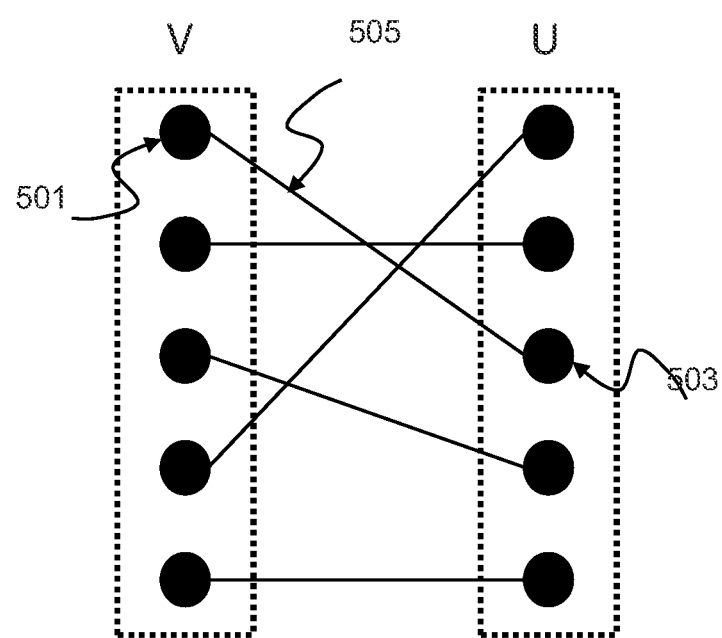
FIG. 5 is a schematic representation of a bipartite graph for signatures of target and reference images according to an example.

The sets of signatures for the target and reference images are formed into a bipartite graph. FIG. 5 is a schematic representation of a bipartite graph for signatures of target and reference images. A set U includes nodes (or points), each of which represent a signature (and which is thus linked to a specific feature) for the target image. A set V includes nodes (or points), each of which represent a signature (and which is thus linked to a specific feature) for the reference image. Each node in V is linked to a node in U by a weighted edge depicted by the lines joining nodes of the graph. Note that the a node in one set is associated with one node in the other set, that is to say, an image feature in the target image is associated with the corresponding feature in the reference image. For example, node 501 is linked to node 503 by edge 505. Node 501 represents a signature for a given image feature from a reference image. There is an equivalent image feature in the target image which has an associated signature at node 503.

In order to match signatures between the sets, and therefore match image features between the target and reference images, a minimum cost flow procedure can be used. That is, if G=(U, V, E) is the bipartite graph, with $|U|=|V|=n$ and $|E|=m$, it is possible to define $w:E \rightarrow \mathbb{R}$ as the weight function defined on the edges (E) of the graph. The objective is to determine a matching $M \subseteq E$ whose cost $w(M)=\Sigma_{e \in M} w(e)$ is minimised. Such objectives are typically referred to as assignment calculations. In order to solve as a minimum cost flow calculation a source vertex s and edges $e_{s,u}=(s, u)$ for every $u \in U$ and a sink vertex t and edges $e_{v,t}=(v, t)$ for every $v \in V$ is defined. The capacity of all edges is defined to be 1. The cost a(e) of an edge $e \in E$ is defined as a(e)=w(e), while the cost of all new edges is defined to be 0. Every matching $M \subseteq E$ defines an integral maximum flow in the new network of cost w(M). Similarly, every integral maximum flow f in the new network corresponds to a maximum matching whose weight is Cost(f).

Figure 6:
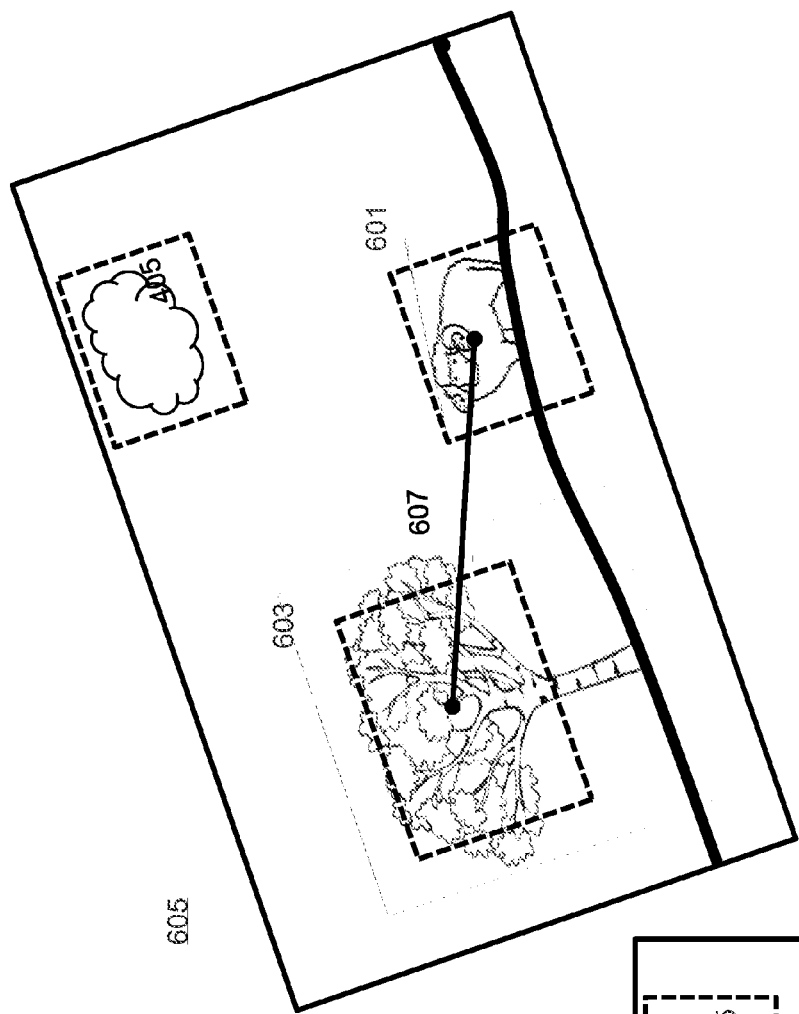
FIG. 6 is a schematic representation of target and reference images showing line segments between features of the images according to an example.
Figure 6:
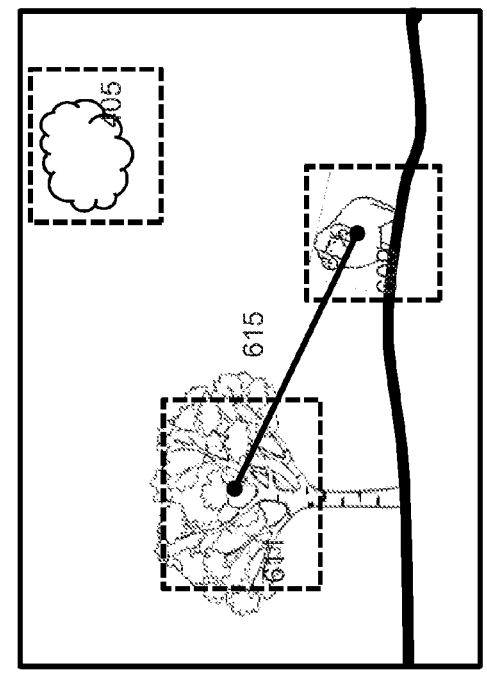

Thus, given a matching between signatures and thus image features between the target and reference images, a set of transformations can be determined for transforming image features from the target image to corresponding features in the reference image. More specifically, in order to generate transformations, a line segment between a pair of image features in the target image (set U) is transformed to a line segment which extends between the equivalent pair of image features in the reference image (set V). With reference to FIG. 6, which is a schematic representation of target and reference images which shows such line segments between features, target image 605 is rotated, translated and scaled compared to reference image 613, such transformations having been caused by a scanning process for example, and thus accurate registration of the images and meaningful comparison of features between the images as they stand is not possible because the images have a different size and shape, and are offset and rotated with respect to one another.

A pair of features 601, 603 in target image 605 defines a line segment 607. In an example, the line segment 607 extends between the centres of the respective features. A pair of features 609, 611 in reference image 613 defines a line segment 615. In an example, the line segment 615 extends between the centres of the respective features. Feature 601 corresponds to feature 609, and feature 603 corresponds to feature 611. That is to say, for a pair of features of the target image 605, the corresponding pair of features in the reference image is selected. The corresponding features are selected with reference to the weight of the edge in the graph described above, such that a selected pair of features from set U are matched to the features in set V which have been classified as being the corresponding (or equivalent) features in that image to the selected features.

A transformation for a line segment can include any one or more of an angle of rotation, a translation, and a scaling of the segment by a scale factor. For every pair of features in set U defining a line segment, a transformation to the line segment between the corresponding features in set V is determined. There are thus n(n−1)/2 pairs given n points. The set of transformations can be binned in order to allow the number of occurrences of each transformation to be determined. Each occurrence of a transformation supplements a measure of the rank of that transformation over all transformations. Accordingly, the transformation with the highest rank, which is to say, the transformation with the largest number of occurrences over all pairs of features, defines a global transformation for the target image which geometrically transforms the target image so that it can be accurately registered or aligned with the reference image. The number of occurrences of a transformation provides a measure of the accuracy of the transformation in providing a global transform for the target image, such that a larger number of occurrences indicates a higher measure of accuracy.

Accordingly, with reference to FIG. 6, if line segment 607 is denoted A, and line segment 615 is denoted B, there is a transformation function f such that f(A)=B. In 2D, if feature 611 has coordinates $(a_x, a_y)$, feature 609 has coordinates $(b_x, b_y)$, feature 601 has coordinates $(d_x, d_y)$, and feature 603 has coordinates $(c_x, c_y)$, then the slope $m_r$ of the line segment 615 is given by $(b_y-a_y)/(b_x-a_x)$. The slope $m_r$ of line segment 607 is given by $(d_y-c_y)/(d_x-c_x)$. Accordingly, the equation $y_r$ of line segment 615 is:

$$y_r - a_y = m_r(x_r - a_x)$$

whilst the equation $y_t$ of line segment 615 is:

$$y_t - c_y = m_r(x_r - c_x)$$

Since the positions of the features are known, the equations of the line segments can be solved, and thus any scale factors, translations and rotations to register (that is, to transform such that line segments lie on top of one other) the line segments can be determined.

Figure 7:
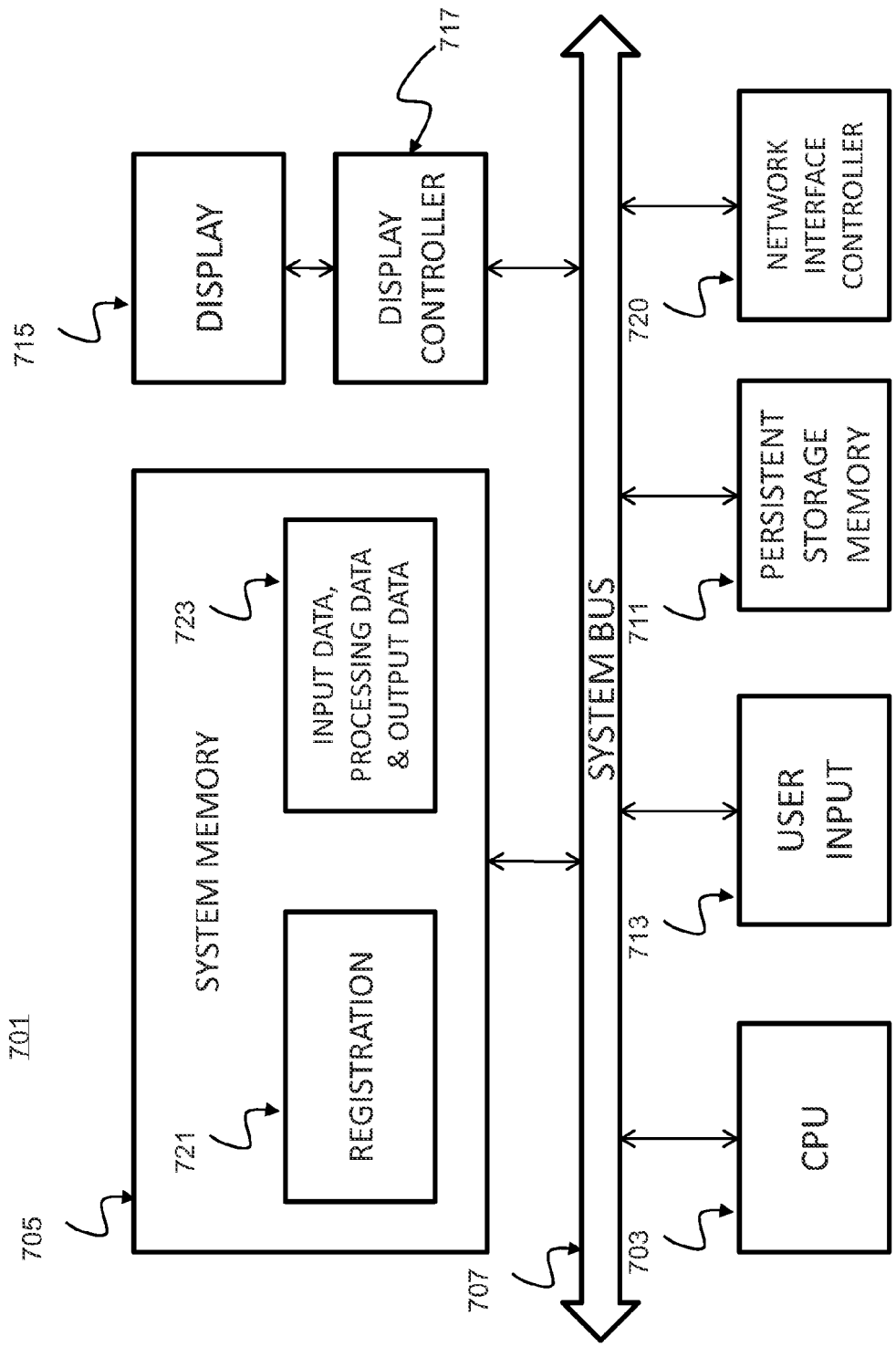
FIG. 7 is a schematic block diagram of a registration system according to an example.

FIG. 7 is a schematic block diagram of a registration system 701 that can implement any of the examples of the image registration system that are described herein. The system 701 can form part of a standalone computing apparatus, or can be part of the print system of FIG. 1. The system 701 includes a processing unit 703 (CPU), a system memory 705, and a system bus 707 that couples processing unit 703 to the various components of the system. The processing unit 703 typically includes one or more processors, each of which may be in the form of any one of various commercially available processors. The system memory 705 typically includes a read only memory (ROM) that stores a basic input/output system (BIOS) that contains start-up routines for the system 701 and a random access memory (RAM). The system bus 707 may be a memory bus, a peripheral bus or a local bus, and may be compatible with any of a variety of bus protocols, including PCI, VESA, Microchannel, ISA, and EISA for example. The system 701 also includes a persistent storage memory 711 (e.g., a hard drive (HDD), a floppy disk drive, a CD-ROM drive, magnetic tape drives, flash memory devices, and digital video disks) that is connected to the system bus 707 and includes one or more computer-readable media disks that provide non-volatile or persistent storage for data, data structures and computer-executable instructions. According to an example, target and reference image data can be stored in memory 711. Registration module 721 within system memory 705 can perform the function of module 110 of print system 100. CPU 703 can perform the tasks of image processor 102 of print system 100, with image data 101 being provided from persistent storage 711 for example.

A user may interact (e.g., enter commands or data) with system 701 using one or more input devices 713 (e.g., a keyboard, a computer mouse, a microphone, joystick, touch pad or touch sensitive display screen). Information may be presented through a user interface that is displayed to a user on the display 715 (implemented by, e.g., a display monitor which can be touch sensitive, including a capacitive, resistive or inductive touch sensitive surface for example), and which is controlled by a display controller 717 (implemented by, e.g., a video graphics card). The system 701 can also include peripheral output devices. One or more remote computers may be connected to the system 701 through a network interface card (NIC) 720. For example, the system 701 can include provision to send retrieved data to a remote location where certain items are prepared for a user. Alternatively, system 701 can upload retrieved data, or a pointer thereto, to a remote storage service such as cloud based storage service for example such that user is able to retrieve that data at a later date using a web-based portal for example.

As shown in FIG. 7, the system memory 705 also includes processing information 723 that includes input data, processing data, and output data. In some examples, the registration module 721 interfaces with a graphics driver to present a user interface on the display 715 for managing and controlling the operation of the system 701. According to an example, registration module 721 can be implemented as a dual registration and comparison module within memory 705. In practical terms, comparison can logically be performed once images have been registered. Data 723 can include information representing the features of a target and reference, the signatures for the images, the bipartite graph data (including the node information and edge weight between nodes for example), as well as data representing a set of image pairs, line segments and determined transformations.

Using the determined transformations, the most frequent transformation which occurs is selected as the global transform for the target/reference image pair in question. That is to say, for each line segment in the images for which a transform is calculated, the transform which occurs the most number of times is selected since this is the transform with the highest probability of most accurately registering the target and reference images. A tolerance can be used to account for transforms which are close enough to be considered the same for the purposes of image registration. For example, a first transform which maps a line segment in a target image to the corresponding line segment in a reference image can be considered to be the same as a second transform if the second transform differs from the first by a negligible amount, such as 1% for example—that is to say, for example, if the scale factor of the second transform differs by an amount<=1% compared to the scale factor in the first transform, with all other transform components the same, the second and first transforms can be considered to the same. Other alternatives are possible, such as having multiple differing transform components for example, or having a larger or smaller (including a zero) tolerance.

Following registration, defect detection can be performed on the registered reference and target images. A defect detection function can implement a structural similarity information measure (SSIM) on a pixel-by-pixel basis for example, although other suitable processes for determining the presence of defects are available. The SSIM is based on the precept that every region in the target image should have a similar region nearby in the reference image, unless it contains a defect and that human visual perception is highly adapted for extracting structural information from an image. A defect detection function using the SSIM can assign a similarity value, S, to two images according to:

$$S(\vec{x}, \vec{y}) = f(l(\vec{x}, \vec{y}), c(\vec{x}, \vec{y}), s(\vec{x}, \vec{y})) \quad (1)$$

where $\vec{x}$ and $\vec{y}$ are image signals corresponding to a target region in the target image and a reference region in the reference image respectively. The SSIM has three components: a luminance measure, l, which compares the mean values of the two regions; a contrast measure, c, which compares the standard deviation of the two regions, and a structural measure, s, which computes the correlation of the two regions. These three measure are based on properties of the image pair, including the signal mean, $\mu_x$:

$$\mu_x = \frac{1}{N} \sum_{i=1}^{N} x_i \quad (2)$$

the signal standard deviation, $\sigma_x$:

$$\sigma_x = \left( \frac{1}{N-1} \sum_{i=1}^{N} (x_i - \mu_x)^2 \right)^{\frac{1}{2}} \quad (3)$$

and a signal cross correlation, $\sigma_{xy}$:

$$\sigma_{xy} = \frac{1}{N-1} \sum_{i=1}^{N} (x_i - \mu_x)(y_i - \mu_y) \quad (4)$$

where summations are over all pixels in the relevant regions and N is the total number of pixels in a region.

Figure 8:
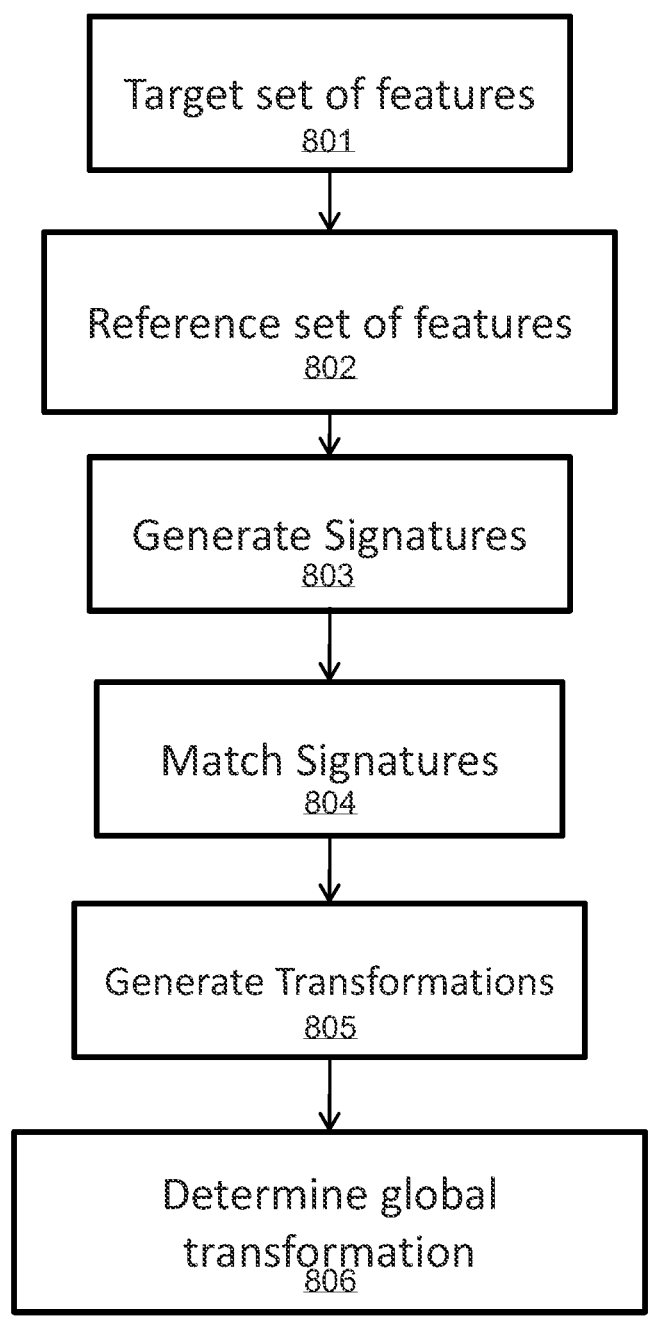
FIG. 8 is a block diagram of a method for registering images according to an example.

FIG. 8 is a block diagram of a method for registering images according to an example. More specifically, FIG. 8 is a block diagram of an image registration method for registering a target image with a reference image. A target set of features present in the target image is determined in block 801. A reference set of features present in the reference image is determined in step 802, which can be a concurrent operation with the determination of the target set of features. In block 803 respective signatures for each feature in the target and reference sets are generated. According to an example, the signatures are normalized histograms as described above. In block 804 features from the target set are matched to corresponding features in the reference set using the signatures, and respective transformations to map pairs of features in the target set to corresponding pairs of features in the reference set are generated in block 805. In block 806 a global transformation for the target image is determined or calculated using a measure of the accuracy of the transformations, such as a measure of the frequency of the transformations for example.

Although the above has been described with reference to the provision of image registration for the purposes of detection of defects in a printed image, the method and system described herein is also generally applicable as a more general image registration method and system, and reference to defect detection is not intended to be limiting. For example, image registration can be used in image processing and manipulation systems. In an image manipulation system for example, multiple images with differing exposures can be registered in order to provide a final image which is an amalgam of the multiple images, where correctly exposed parts of each image are used as the basis for the corresponding part of the final image for example.

What is claimed is:

1. An image registration method for registering a target image with a reference image, comprising:
   determining a target set of features present in the target image;
   determining a reference set of features present in the reference image;
   generating respective signatures for each feature in the target and reference sets;
   matching features from the target set to corresponding features in the reference set using the signatures;
   generating respective transformations to map pairs of features in the target set to corresponding pairs of features in the reference set; and
   determining a global transformation for the target image using a measure of the accuracy of the transformations,
   wherein determining target and reference sets of features includes determining regions with similar colors in the target and reference images and clustering such regions, each cluster representing a feature centered on the cluster, wherein the center is described by both its color and position.

2. An image registration method as claimed in claim 1, wherein a signature for a feature is a geometric signature including a histogram of normalized distances between the feature and all other features in the set.

3. An image registration method as claimed in claim 1, wherein transformations are geometric transformations generated over all pairs of determined image features.

4. An image registration method as claimed in claim 1, wherein generating transformations to map pairs of features further comprises:
   constructing a line segment between a pair of features in the target set;
   constructing a line segment between a corresponding pair of features in the reference set, and determining a transformation to transform the line segment from the pair of features in the target set to the line segment from the pair of features in reference set, the transformation including at least one measure for an angle of rotation, translation, or scale factor; and
   repeating over all pairs of determined image features.

5. An image registration method as claimed in claim 1, wherein the global transformation for the target image is the transformation which occurs most often.

6. An image registration method as claimed in claim 5, further comprising:

determining the number of occurrences of a transformation, wherein each occurrence increases the rank of a transformation over all transformations.

7. An image registration method as claimed in claim 6, wherein determining the global transformation includes selecting the transformation with the highest rank.

8. A print system, comprising:

a print assembly;

an image processor to convert an input image to a raster image for the print assembly and to provide a reference image from the input image or raster image;

an image capture assembly to capture an image of at least a portion of a printed medium in order to provide a target image; and a registration module to generate a transformation for transforming the target image for registration with the reference image by matching features in the target image with equivalent features in the reference image using signatures for respective ones of the features, determine a global transformation for the target image based on the transformation of pairs of features in the target image to equivalent pairs of features in the reference image, wherein to determine equivalent features the registration module is to determine features in the target and reference images according to a measure of clusters of colors in the images, and generate signatures for respective ones of the determined features, wherein a signature for a feature is a geometric signature including a histogram of normalized distances from the feature to all other determined features for the image.

9. A print system as claimed in claim 8, wherein the registration module is further to register the target image with the reference image using the global transformation and to detect defects in the target image by comparing the registered images.

10. A print system as claimed in claim 8, wherein to determine a global transformation for the target image the registration module is to:

construct a line segment between a pair of features in the target image;

construct a line segment between an equivalent pair of features in the reference image and determine a geometric transformation to transform the line segment of the target image to the line segment of the reference image, the transformation including at least one measure for an angle of rotation, translation, and scale factor.

11. A print system as claimed in claim 8, wherein the registration module is further to arrange signatures for the target and reference images into respective sets, and to form a maximum weighted bipartite matching between signatures in the sets.

12. A non-transitory computer readable medium including machine readable instructions for instructing a print system to perform an automated method including:

to provide a reference image, at least a portion of which for forming the basis of a printed image;

to process a raster image;

to send the raster image to a print process;

to print a printed image corresponding to the raster image onto a medium;

to capture a target image from at least a part of the printed image, and to determine a global feature-based transform for the target image based on feature matching between the target and reference images, and to register the reference image and the target image using the determined transform, wherein features are determined according to a measure of clusters of colors in the target and reference images, each cluster representing a feature centered on the cluster, wherein the center is described by both its color and position.

13. A computer readable medium as claimed in claim 12 including machine readable instructions for instructing a print system to perform an automated method further including:

to determine respective transforms for transforming line segments disposed between pairs of features in the target image to line segments disposed between corresponding pairs of features in the reference image.

* * * * *